(12) United States Patent
Gonzalez et al.

(10) Patent No.: US 11,364,687 B2
(45) Date of Patent: Jun. 21, 2022

(54) COMPENSATING FOR DIMENSIONAL VARIATION IN 3D PRINTING

(71) Applicant: HEWLETT-PACKARD DEVELOPMENT COMPANY, L.P., Spring, TX (US)

(72) Inventors: Sergio Gonzalez, Sant Cugat del Valles (ES); Matthew A Shepherd, Vancouver, WA (US); Scott White, Boise, ID (US); Barret Kammerzell, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/605,067

(22) PCT Filed: Apr. 10, 2018

(86) PCT No.: PCT/US2018/026912
§ 371 (c)(1),
(2) Date: Oct. 14, 2019

(87) PCT Pub. No.: WO2019/199285
PCT Pub. Date: Oct. 17, 2019

(65) Prior Publication Data
US 2021/0331400 A1    Oct. 28, 2021

(51) Int. Cl.
*B29C 64/393* (2017.01)
*B33Y 50/02* (2015.01)
*G06T 17/00* (2006.01)

(52) U.S. Cl.
CPC ............ *B29C 64/393* (2017.08); *B33Y 50/02* (2014.12); *G06T 17/00* (2013.01)

(58) Field of Classification Search
CPC ........ B29C 64/393; G06T 17/00; B33Y 50/02
See application file for complete search history.

(56) References Cited

U.S. PATENT DOCUMENTS 5,619,419 A * 4/1997 D'Haeseleer ......... G06F 30/392
716/123
2001/0003004 A1    6/2001 Leyden et al.
(Continued)

FOREIGN PATENT DOCUMENTS

DE    102016115916 A1    3/2018
JP    2003181941 A    7/2003
(Continued)

OTHER PUBLICATIONS

Cajal, C. et al., "Efficient volumetric error compensation technique for additive manufacturing machines", Rapid Prototyping Journal, vol. 22 No. 1, 2016, p. 2-19.
(Continued)

*Primary Examiner* — Thomas C Lee
*Assistant Examiner* — Michael Tang
(74) *Attorney, Agent, or Firm* — Dierker & Kavanaugh PC; Nathan Rieth

(57) ABSTRACT

In an example implementation, a method of compensating for dimensional variation in 3D printing includes receiving a 3D object model that represents a 3D part to be printed. The method also includes receiving a build material type and a position for printing the 3D part within a build volume. The method includes determining from the position, target subvolumes of the build volume into which the 3D part is to be printed, retrieving a dimensional compensation factor associated with each target subvolume, and then applying each dimensional compensation factor to the 3D object model to scale the 3D part according to the position of the 3D part within the build volume.

14 Claims, 7 Drawing Sheets

(56) References Cited

U.S. PATENT DOCUMENTS

| | | | | |
|---|---|---|---|---|
| 2008/0291478 | A1* | 11/2008 | Shibuya | H04N 1/6019 |
| | | | | 358/1.9 |
| 2010/0121476 | A1 | 5/2010 | Kritchman | |
| 2010/0191360 | A1* | 7/2010 | Napadensky | B29C 64/268 |
| | | | | 700/98 |
| 2011/0279651 | A1* | 11/2011 | Hong | H04N 13/128 |
| | | | | 348/47 |
| 2014/0107823 | A1 | 4/2014 | Huang | |
| 2016/0046074 | A1* | 2/2016 | Jang | B33Y 50/02 |
| | | | | 700/119 |
| 2016/0046076 | A1 | 2/2016 | Huang et al. | |
| 2016/0082666 | A1* | 3/2016 | de Pena | B29C 64/393 |
| | | | | 700/98 |
| 2016/0086376 | A1 | 3/2016 | Tang et al. | |
| 2017/0252979 | A1 | 9/2017 | Donovan | |
| 2017/0372480 | A1 | 12/2017 | Anand et al. | |
| 2018/0086001 | A1 | 3/2018 | Kim et al. | |
| 2019/0054700 | A1* | 2/2019 | Chandar | B33Y 50/02 |

FOREIGN PATENT DOCUMENTS

| | | | | |
|---|---|---|---|---|
| JP | 2015182426 | A | 10/2015 | |
| JP | 2016155257 | A | 9/2016 | |
| JP | 2016224887 | A | 12/2016 | |
| JP | 2018049335 | A | 3/2018 | |
| JP | 2018051951 | A | 4/2018 | |
| KR | 1020170099363 | | 8/2017 | |
| KR | 1020170100000 | | 9/2017 | |
| WO | WO01997011837 | A1 | 4/1997 | |
| WO | WO-2016032544 | A1 * | 3/2016 | B29C 64/386 |
| WO | WO-2016053263 | A1 * | 4/2016 | B33Y 50/02 |
| WO | WO2017/174160 | | 10/2017 | |

OTHER PUBLICATIONS

Tong, K. et al., "Error compensation for fused deposition modeling (FDM) machine by correcting slice files", Rapid Prototyping Journal, vol. 14 No. 1, 2008, p. 4-14.

Tong, K. et al., "Parametric error modeling and software error compensation for rapid prototyping", Rapid Prototyping Journal, vol. 9 No. 5, 2003, p. 301-313.

Cajal, C. et al., "Volumetic error compensation technique for 3D Printers", ScienceDirect, Procedia Engineering 63 (2013) pp. 642-649.

* cited by examiner

COMPENSATING FOR DIMENSIONAL VARIATION IN 3D PRINTING

BACKGROUND

Additive manufacturing processes can produce three-dimensional (3D) objects by providing a layer-by-layer accumulation and solidification of build material patterned from digital 3D object models. In some examples, inkjet printheads can selectively print (i.e., deposit) liquid functional agents such as fusing agents or binder liquids onto layers of build material within patterned areas of each layer. The liquid agents can facilitate the solidification of the build material within the printed areas. For example, fusing energy can be applied to a layer to thermally fuse together build material in areas where a liquid fusing agent has been applied. The solidification of selected regions of build material can form 2D cross-sectional layers of the 3D object being produced, or printed.

BRIEF DESCRIPTION OF THE DRAWINGS

Examples will now be described with reference to the accompanying drawings, in which.

Throughout the drawings, identical reference numbers designate similar, but not necessarily identical, elements.

DETAILED DESCRIPTION

Figure 1:
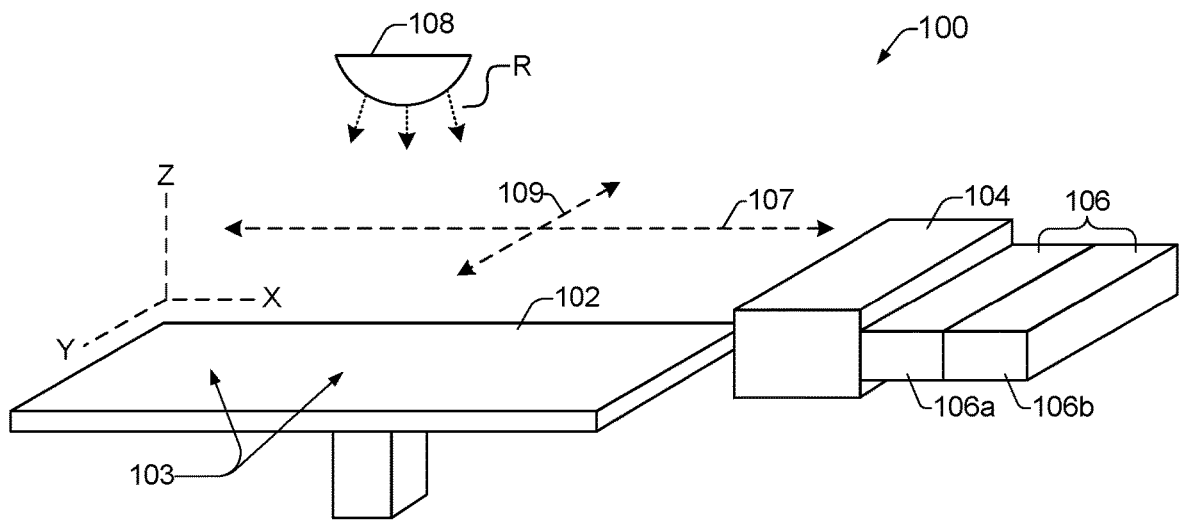
FIG. 1 shows a block diagram of an example of a 3D printing system suitable for providing compensation for dimensional variations that can occur during printing of 3D parts.
Figure 1:
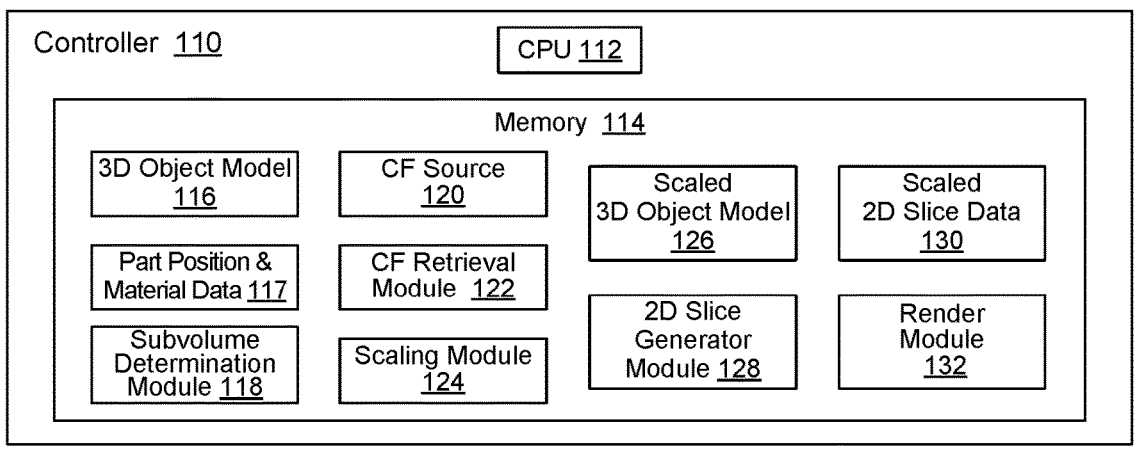

In some additive manufacturing processes, such as some 3D printing processes, for example, 3D objects or parts can be formed on a layer-by-layer basis where each layer is processed and portions thereof are combined with a subsequent layer until the 3D object is fully formed. Throughout this description, the terms 'part' and 'object' and their variants may be used interchangeably. In addition, while 3D printing processes are generally used throughout this description as example processes, other processes such as binder jetting, laser metal deposition, and other powder bed-based processes can provide similarly suitable examples. Furthermore, while build material is generally referred to herein as being powdered build material, such as powdered nylon, there is no intent to limit the form or type of build material that may be used when producing a 3D object from a 3D digital object model. Various forms and types of build materials may be appropriate and are contemplated herein. Examples of different forms and types of build materials can include, but are not limited to, short fibers that have been cut into short lengths or otherwise formed from long strands or threads of material, and various powder and powder-like materials including plastics, ceramics, metals, and the like.

In various 3D printing processes and other additive manufacturing processes, layers of a 3D object being produced can be patterned from 2D slices of a digital 3D object model, where each 2D slice defines portions of a powder layer that are to form a layer of the 3D object. Information in a 3D object model, such as geometric information that describes the shape of the 3D model, can be stored as plain text or binary data in various 3D file formats, such as STL, VRML, OBJ, FBX, COLLADA, 3MF, and so on. Some 3D file formats can store additional information about 3D object models, such as information indicating colors, textures and/or surface finishes, material types, and mechanical properties and tolerances, as well as the orientation and positioning that a 3D object will have as it is being formed within a build area of a 3D printing system during printing.

The information in a 3D object model can define solid portions of a 3D object to be printed or produced. To produce a 3D object from a 3D object model, the 3D model information can be processed to provide 2D planes or slices of the 3D model. In different examples, 3D printers can receive and process 3D object models into 2D slices, or they can receive 2D slices that have already been processed from 3D object models. Each 2D slice generally comprises an image and/or data that can define an area or areas of a layer of build material (e.g., powder) as being solid part areas where the powder is to be solidified during a 3D printing process. Thus, a 2D slice of a 3D object model can define areas of a powder layer that are to receive (i.e., be printed with) a liquid functional agent such as a fusing agent or a binding agent. Conversely, areas of a powder layer that are not defined as part areas by a 2D slice, comprise non-part areas where the powder is not to be solidified. Non-part areas may receive no liquid functional agent, or they may receive a detailing agent that can be selectively applied around part contours, for example, to cool the surrounding build material and keep it from fusing.

In some example powder-based and fusing agent 3D printing systems, layers of powdered build material can be spread over a platform or print bed within a build area or build volume. As noted above, a liquid functional agent (i.e., a fusing agent) can be selectively applied to each powder layer in areas where the particles of powdered material are to be fused together or solidified to form a part as defined by each 2D slice of a 3D object model. Each layer in the build area can be exposed to a fusing energy to thermally fuse together and solidify the particles of powdered material where the fusing agent has been applied. This process can be repeated, one layer at a time, until a 3D part or 3D parts have been formed within the build area.

In some additive manufacturing processes that use heat to melt and solidify layers of build material to form 3D parts, such as the 3D printing processes noted above, the printed part cools down to ambient temperature once all the layers of the part have been printed. During this cooling process, the printed part can experience dimensional variations such as part shrinkage. This shrinkage is known to be somewhat dependent upon the type of build material being used to form the part. In addition to the type of build material forming the part, however, there are other factors that can influence dimensional variations as a part cools. Thermal non-uniformities within the build area or build volume of a 3D printing system, for example, can cause a 3D part to experience different levels of shrinkage depending on the position of the part within the build volume. For example, different areas within the build volume may have different thermal profiles and may cool at different rates, which can cause parts within those areas to shrink differently. Therefore, different parts can experience different levels of shrinkage depending on their positioning within the build volume. In addition, depending on the positioning of a part within the build volume, the whole part may experience a uniform level of shrinkage, or different areas of the part may experience different levels of shrinkage.

Some prior methods of addressing such dimensional variations (e.g., part shrinkage) in 3D printing include scaling the 3D object model of a part based on the type of build material being used to form the part. Thus, different dimensional compensation factors can be applied to scale a 3D object model depending on the type of build material being used to print the part. After cooling down, the final printed part can have improved dimensional accuracy compared to parts that have not been similarly scaled. In such prior methods, however, a single dimensional compensation is generally applied to the whole build volume of the 3D printing system, regardless of the number and/or location of parts being printed within the build volume. In addition, the scaling is done from the center of the printable area of the build volume so that the relative position of parts within a print job is not altered. Therefore, while such prior methods can help to improve the dimensional accuracy of printed parts, they do not account for other factors that may influence dimensional variation in the parts.

For example, various factors can influence the dimensional accuracy of parts being printed within different locations or volumetric areas within a build volume. As mentioned, thermal non-uniformities throughout the build volume, for example, can cause parts printed in different locations of the build volume to cool at different rates, which can cause dimensional variations among the parts and within single parts. More specifically, parts printed in areas of the build volume that cool more quickly, can experience greater shrinkage than parts printed in areas of the build volume that cool more slowly.

Furthermore, prior methods for addressing dimensional variations in 3D printing generally involve sending pre-processed 3D object model data to the 3D printing system. That is, dimensional compensation is often applied to 3D object models by another remote system prior to the compensated models being submitted to the 3D printing system for printing. These methods of compensating for dimensional variations in 3D printing mostly preclude a 3D printing system from having any control over how the dimensional compensation is applied to 3D object models. In addition, such methods can involve regenerating and resending to the 3D printing system, new 3D object model data (e.g, a new 3MF file) for every different type of build material used to form a part, and/or for every different printing profile a user may want to apply to a particular 3D part being printed.

Accordingly, example methods and systems described herein can provide compensation for dimensional variations that can occur during printing of 3D parts. Example 3D printing systems and methods can compensate for dimensional variations in printed parts (e.g., part shrinkage) that are associated with particular volumetric subdivisions, or subvolumes, of a build volume. A build volume can be divided into multiple subvolumes (i.e., volumetric subdivisions), and a particular dimensional compensation factor can be associated with each subvolume of the build volume. A compensation factor associated with a particular subvolume can then be applied to scale any portion of a 3D object model that is to be printed within that particular subvolume.

Furthermore, each particular subvolume within the build volume can have multiple associated dimensional compensation factors, wherein each different compensation factor is further associated with a particular type of build material that can be used to print a part (or a portion of a part) within the particular subvolume. Thus, if a 3D printing system is capable of printing parts using five different types of build materials, for example, then each particular subvolume of the build volume can be associated with five different compensation factors, where each compensation factor is associated with a different one of the five types of available build materials. Dimensional compensation factors can be predetermined for each subvolume and material type based on empirical dimensional data taken from measured parts that have been previously printed within each subvolume. In some examples, compensation factors can be stored on a 3D printing system in a look-up table that associates each compensation factor with a particular subvolume and with a particular type of build material. Thus, appropriate dimensional compensation factors can be determined from a source such as from a look-up table based on the type of material to be used to print the 3D part as well as the position or subvolume in which the 3D part is to be printed within the build volume. The dimensional compensation factors can be applied to 3D object models, and/or portions of 3D object models to scale the dimensions of corresponding 3D parts so that the parts can be printed with their intended dimensions, regardless of the type of material used to print the parts or the particular subvolumes in which the parts are printed.

In a particular example, a method of compensating for dimensional variation in 3D printing includes receiving a 3D object model that represents a 3D part to be printed. The method also includes receiving a build material type and a position for printing the 3D part within a build volume. In different examples, the build material type and the position can be received along with, or independent of, the 3D object model. The method includes determining from the position, target subvolumes of the build volume into which the 3D part is to be printed, retrieving a dimensional compensation factor associated with each target subvolume, and then applying each dimensional compensation factor to the 3D object model to scale the 3D part according to the position of the 3D part within the build volume.

In another example, a dimensional variation compensating 3D printing system includes a memory to receive a 3D object model that represents a 3D part to be printed within a build volume of the system. The system includes a processor programmed to identify a target subvolume within the build volume in which a portion of the 3D part is to be printed. The system includes a source for dimensional compensation factors associated with each of multiple subvolumes within the build volume. The processor is programmed to access the source, retrieve a compensation factor associated with the target subvolume, and scale the portion of the 3D object model with the compensation factor. The system comprises print system components controlled by the processor to print the portion of the 3D part into the target subvolume according to the scaled portion of the 3D object model.

In another example, a method of compensating for dimensional variation in 3D printing includes receiving a 3D object model that represents a 3D part to be printed. The method includes identifying within a build volume of a 3D printing system, a target subvolume in which a portion of the 3D part is to be printed, retrieving a compensation factor associated with the target subvolume, scaling the portion of the 3D object model with the compensation factor, and printing the portion of the 3D part in the target subvolume according to the scaled portion of the 3D object model.

FIG. 1 shows a block diagram of an example of a 3D printing system 100 suitable for providing compensation for dimensional variations that can occur during printing of 3D parts. The 3D printing system 100 is shown by way of example only and is not intended to represent a complete 3D printing system. Thus, it is understood that an example system 100 may comprise additional components and may perform additional functions not specifically illustrated or discussed herein.

An example 3D printing system 100 includes a moveable print bed 102, or build platform 102 to serve as the floor to a work space or build volume/area 103 in which 3D objects can be printed. In some examples the print bed 102 can move in a vertical direction (i.e., up and down) in the z-axis direction. The build volume 103 of a 3D printing system generally refers to a volumetric work space that develops above the moveable print bed 102 as the print bed moves vertically downward during the layer-by-layer printing and solidification of each layer of a 3D part. This work space can be alternately referred to herein as a build volume, a build area, a work space, and the like. In some examples, the build volume 103 can be subdivided into subvolumes as discussed in more detail below. An example 3D printing system 100 also includes a powdered build material distributor 104 that can provide a layer of powder over the print bed 102. In some examples, a suitable powdered build material can include PA12 build material commercially known as V1R10A "HP PA12" available from HP Inc. The powder distributor 104 can include a powder supply and powder spreading mechanism such as a roller or blade to move across the print bed 102 in the x-axis direction to spread a layer of powder.

A liquid agent dispenser 106 can deliver a liquid functional agent such as a fusing agent and/or detailing agent from a fusing agent dispenser 106a and detailing agent dispenser 106b, respectively, in a selective manner onto areas of a powder layer provided on the print bed 102. In some examples, a suitable fusing agent can include an ink-type formulation comprising carbon black, such as the fusing agent formulation commercially known as V1Q60Q "HP fusing agent" available from HP Inc. In different examples, fusing agent formulations can also comprise an infra-red light absorber, a near infra-red light absorber, a visible light absorber, and a UV light absorber. Inks comprising visible light enhancers can include dye based colored ink and pigment based colored ink, such as inks commercially known as CE039A and CE042A available from HP Inc. An example of a suitable detailing agent can include a formulation commercially known as V1Q61A "HP detailing agent" available from HP Inc. Liquid agent dispensers 106 can include, for example, a printhead or printheads, such as thermal inkjet or piezoelectric inkjet printheads. In some examples, a printhead dispenser 106 can comprise a page-wide array of liquid ejectors (i.e., nozzles) that spans across the full y-axis dimension of the print bed 102 and moves bi-directionally (i.e., back and forth) in the x-axis as indicated by direction arrow 107 while it ejects liquid droplets onto a powder layer spread over the print bed 102. In other examples, a printhead dispenser 106 can comprise a scanning type printhead. A scanning type printhead can span across a limited portion or swath of the print bed 102 in the y-axis dimension as it moves bi-directionally in the x-axis as indicated by direction arrow 107, while ejecting liquid droplets onto a powder layer spread over the print bed 102. Upon completing each swath, a scanning type printhead can move in the y-axis direction as indicated by direction arrow 109 in preparation for printing another swath of the powder layer on print bed 102.

The example 3D printing system 100 also includes a fusing energy source 108, such as radiation source 108, that can apply radiation R to powder layers on the print bed 102 to facilitate the heating and fusing of the powder. In some examples, the energy source 108 can comprise a scanning energy source that scans across the print bed 102 in the x-axis direction. In some examples, where a 3D printing system comprises a binder jetting system that can print a liquid binder agent onto different materials such as metals, ceramics, and plastics, for example, the system 100 can include a binder agent drying/curing unit (not shown).

Referring still to FIG. 1, an example 3D printing system 100 additionally includes an example controller 110. The example controller 110 can control various components and operations of the 3D printing system 100 to facilitate the printing of 3D parts as generally described herein, such as controllably spreading powder onto the print bed 102, selectively applying/printing fusing agent and detailing agent to portions of the powder, and exposing the powder to radiation R. In addition, the controller 110 can further control components and operations of the 3D printing system 100 to provide compensation for dimensional variations that can occur during the printing of 3D parts.

As shown in FIG. 1, an example controller 110 can include a processor (CPU) 112 and a memory 114. The controller 110 may additionally include other electronics (not shown) for communicating with and controlling various components of the 3D printing system 100. Such other electronics can include, for example, discrete electronic components and/or an ASIC (application specific integrated circuit). Memory 114 can include both volatile (i.e., RAM) and nonvolatile memory components (e.g., ROM, hard disk, optical disc, CD-ROM, flash memory, etc.). The components of memory 114 comprise non-transitory, machine-readable (e.g., computer/processor-readable) media that can provide for the storage of machine-readable coded program instructions, data structures, program instruction modules, JDF (job definition format), plain text or binary data in various 3D file formats such as STL, VRML, OBJ, FBX, COLLADA, 3MF, and other data and/or instructions executable by a processor 112 of the 3D printing system 100.

As shown in the example controller 110 of FIG. 1, an example of executable instructions to be stored in memory 114 can include instructions associated with modules 118, 122, 124, 128, and 132, while an example of stored data can include 3D object model data 116, part/object position and material data 117, a compensation factor data source 120 such as lookup table data 120, scaled 3D object model data 126, and scaled 2D slice data 130. Thus, a 3D printing system 100 can receive a 3D object model 116 that represents a part to be printed. The 3D object model 116 can be received in a 3D file format such as 3MF, for example. The 3D object model 116 can include geometric information that describes the shape of the 3D model, as well as information indicating colors, surface textures, build material types, the position for printing the 3D part within the build volume 103, and so on. In some examples, information about the 3D part, such as the 3D part position and material type 117, can be received independently from the 3D object model 116, perhaps as user input or otherwise, and stored in memory 114.

In some examples, when the 3D printing system 100 receives a 3D object model 116, the processor 112 can execute instructions from a subvolume determination module 118. The subvolume determination module 118 executes to determine where within the build volume 103 the 3D part is to be printed. This can be determined from positioning information received with the 3D object model 116, or received independently as part position data 117, for example. Positioning information can include, for example, X, Y, and Z, axis coordinates that locate the part to be printed within the build volume 103, such as the build volume 103 shown in FIG. 2. When the position of the 3D part is retrieved, or otherwise determined, the subvolume determination module 118 further executes to determine subvolumes 134 (FIG. 2) within the build volume 103 that the 3D part is to be printed in. Subvolumes 134 into which a 3D part is to be printed can be referred to as target subvolumes. One example method for determining the target subvolumes 134 into which a part is to be printed is discussed below with respect to FIGS. 4 and 5.

Figure 2:
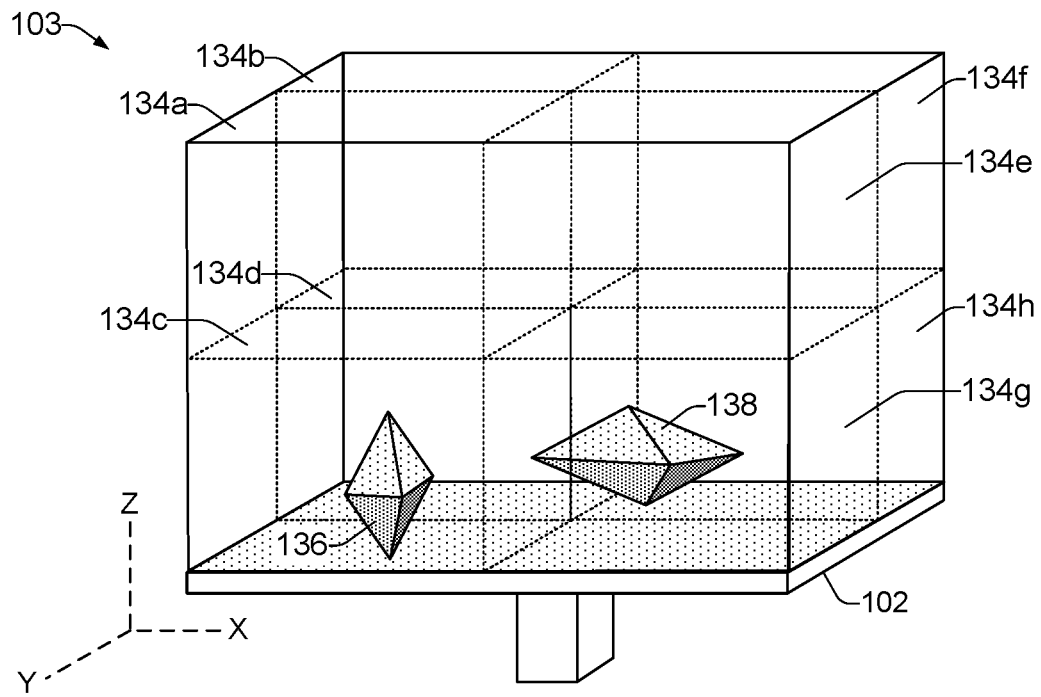
FIG. 2 shows an example of a build volume that has been subdivided into multiple subvolumes.

FIG. 2 shows an example of a build volume 103 that has been subdivided into multiple volumetric subdivisions, or subvolumes 134 (illustrated as subvolumes 134a, 134b, 134c, 134d, 134e, 134f, 134g, and 134h). While the example build volume 103 shown in FIG. 2 has been divided into eight equally sized, and rectangular shaped subvolumes, other subvolume configurations are possible. Therefore, other examples may include any number of subvolumes, having virtually any corresponding sizes and shapes that ultimately account for the entire volume of the build volume 103.

FIG. 2 also shows examples of two parts 136 and 138 that are to be printed within the build volume 103. Referring to FIGS. 1 and 2, the subvolume determination module 118 executes to determine target subvolumes into which the parts are to be printed. In the example shown in FIG. 2, a first part 136 is to be printed in the lower left, front, subvolume 134c, and the second part 138 is to be printed in both of the lower, rear, subvolumes, 134h and 134d. Thus, subvolumes 134c, 134h, and 134d are target subvolumes into which a 3D part, or a portion of a 3D part, is to be printed. The two parts 136 and 138 shown in FIG. 2 help to illustrate that in different examples, parts can be printed within a single subvolume 134 or they can be printed within multiple subvolumes.

Figure 3:
FIG. 3 shows an example look-up table with example dimensional compensation factors.

Once target subvolumes are identified in which a part or parts are to be printed, dimensional compensation factors can be retrieved, for example, from a compensation factor data source 120 such as the example look-up table 120 shown in FIG. 3. While a compensation factor data source 120 is discussed and illustrated herein as comprising a look-up table, other compensation factor sources 120 are possible and are contemplated. In some examples, for instance, a compensation factor source 120 may comprise a set of executable instructions that cause the processor 112 to perform a process for generating the dimensional compensation factors. In the current example, FIG. 3 shows a look-up table 120 with examples of dimensional compensation factors that are referenced or associated with the type of build material to be used to print the part (i.e., M1-M5) and with the particular subvolumes 134 (134a, 134b, 134c, 134d, 134e, 134f, 134g, and 134h) in which a part is to be printed. A processor 112 executing instructions from a compensation factor retrieval module 122 can retrieve the appropriate compensation factors from the look-up table 120 or other source that are associated with identified target subvolumes as well as whichever type of build material that is to be used to print the part. As noted above, information about the type of build material to be used can be received with the 3D object model 116, or by some other independent method such as through a user input and stored as part material type 117. The compensation factors shown in FIG. 3 are shown by way of example only. In general, a compensation factor can comprise a value that indicates a scaling percentage by which a dimension of a 3D part can be compensated to help ensure that the final printed part matches its intended dimensions. Thus, by way of example only and not by way of limitation, appropriate compensation factors may range in value from less than one percent to some percent greater than one percent.

Referring generally to FIGS. 1-3, when the appropriate dimensional compensation factors have been retrieved, a processor 112 executing instructions from a scaling module 124 can apply the compensation factors to the 3D object model 116 to scale the dimensions of the model, resulting in a scaled 3D object model 126. For example, with regard to a first part 136 shown in FIG. 2, a single compensation factor associated with a target subvolume 134c and a material type such as M1 shown in the table 120 of FIG. 3, can be applied to scale the whole part. With regard to a second part 138, multiple compensation factors associated with target subvolumes 134d and 134h, and further associated with a material type such as M3 shown in the table 120, can be applied to scale the different portions of the part 138 according to the part's location within the different subvolumes 134d and 134h. Thus, one portion of the part 138 can be scaled according to a first compensation factor, while another portion of the part 138 can be scaled according to a second compensation factor.

After a 3D object model 116 is scaled by appropriate dimensional compensation factors, the scaled 3D object model 126 can be processed into scaled 2D slice data 130 for printing. The processor 112 can execute instructions from a 2D slice generator module 128, for example, to generate the scaled 2D slice data 130. The processor 112 can then further execute instructions from the render module 132 to generate 3D print system commands that can control the operation of components of the 3D printing system 100 in order to print layers of a 3D part corresponding with the scaled 2D slice data 130.

Figure 4:
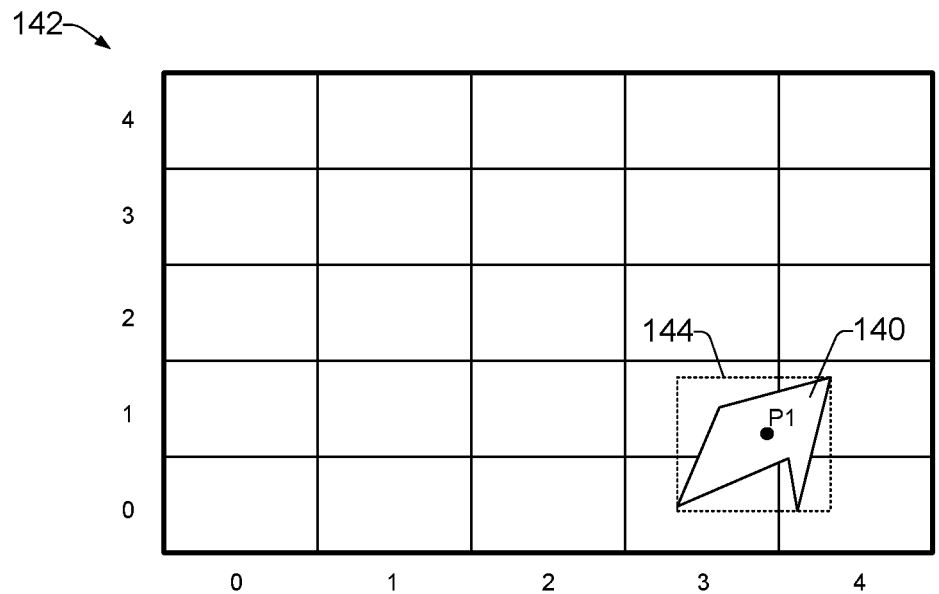
FIG. 4 shows an example of a 2D part positioned on a 2D grid.
Figure 5:
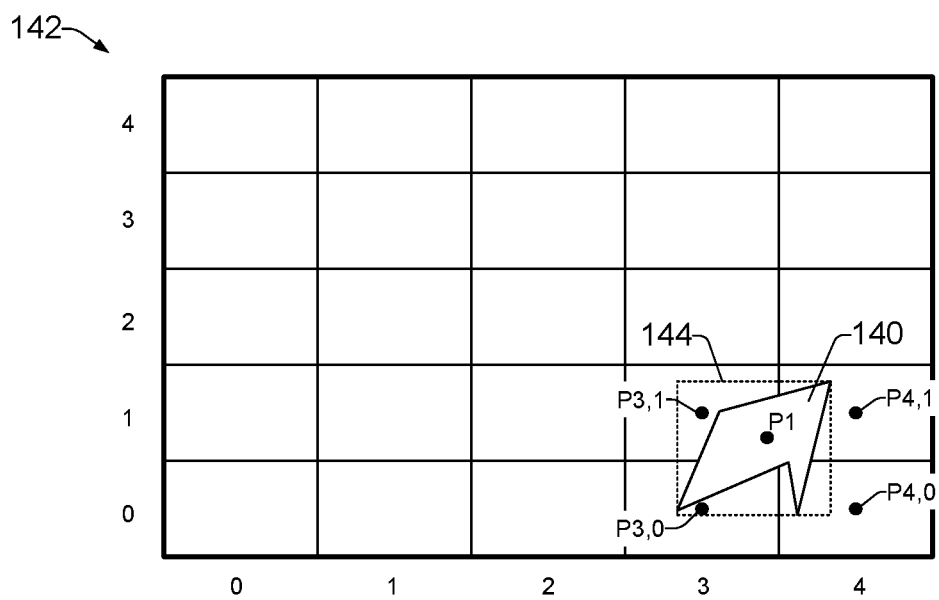
FIG. 5 shows an example of a 2D part on a 2D grid where the center points for grid subdivisions are computed; and, FIGS. 6, 7, 8, and 9, are flow diagrams showing example methods of compensating for dimensional variation in 3D printing.

As noted above, FIGS. 4 and 5 illustrate one example method for determining which subvolumes 134 are target subvolumes in which a part is to be printed, and the compensation factors to be applied to the part. For the sake of simplification, the example method can be illustrated and discussed with respect to a 2D example. FIG. 4 shows a 2D part 140 on a 2D grid 142. The 2D part 140 can be used in this example to represent a 3D object model 116 that has been loaded into a 3D printing system 100. The 2D example part 140 can be located within the 2D grid divisions according to 2D coordinate positioning, in the same manner as a 3D part can be located within a build volume 103 according to X, Y, Z coordinate information received with a 3D object model 116. The divisions within the 2D grid 142 can represent 3D subvolumes 134 within a build volume 103 as generally discussed above, where each grid division has an assigned compensation factor. After a part 140 is positioned within the 2D grid 142 (analogous in 3D with the build volume 103), as shown in FIG. 4, a bounding box 144 can be determined for the part 140, and the center point P1 of the bounding box 144 can be computed. FIG. 5 shows the part 140 on 2D grid 142 where the center points for each grid subdivision that is closest to the center point P1 are computed. Thus, FIG. 5 shows points on the 2D grid at P3,0, P4,0, P4,1 and P3,1. The distance from P1 to all of the points P3,0, P4,0, P4,1 and P3,1, can then be computed and used to compute a bilinear interpolation (a trilinear interpolation in the 3D case). A bilinear interpolation from the center point P1 can determine a smoothly changing compensation value within each grid subdivision (or each subvolume in 3D) based on the compensation factor assigned to each grid subdivision.

FIGS. 6, 7, 8, and 9 are flow diagrams showing example methods 600, 700, 800, and 900, respectively, of compensating for dimensional variation in three-dimensional (3D) printing. Method 700 comprises extensions of method 600 and incorporates additional details of method 600, while method 900 comprises extensions of method 800 and incorporates additional details of method 800. Methods 600-900 are associated with examples discussed above with regard to FIGS. 1-5, and details of the operations shown in methods 600-900 can be found in the related discussion of such examples. The operations of methods 600-900 may be embodied as programming instructions stored on a non-transitory, machine-readable (e.g., computer/processor-readable) medium, such as memory/storage 114 shown in FIG. 1. In some examples, implementing the operations of methods 600-900 can be achieved by a controller, such as a controller 110 of FIG. 1, reading and executing the programming instructions stored in a memory 114. In some examples, implementing the operations of methods 600-900 can be achieved using an ASIC and/or other hardware components alone or in combination with programming instructions executable by a controller 110.

The methods 600-900 may include more than one implementation, and different implementations of methods 600-900 may not employ every operation presented in the respective flow diagrams of FIGS. 6-9. Therefore, while the operations of methods 600-900 are presented in a particular order within their respective flow diagrams, the order of their presentations is not intended to be a limitation as to the order in which the operations may actually be implemented, or as to whether all of the operations may be implemented. For example, one implementation of method 600 might be achieved through the performance of a number of initial operations, without performing other subsequent operations, while another implementation of method 600 might be achieved through the performance of all of the operations.

Figure 6:
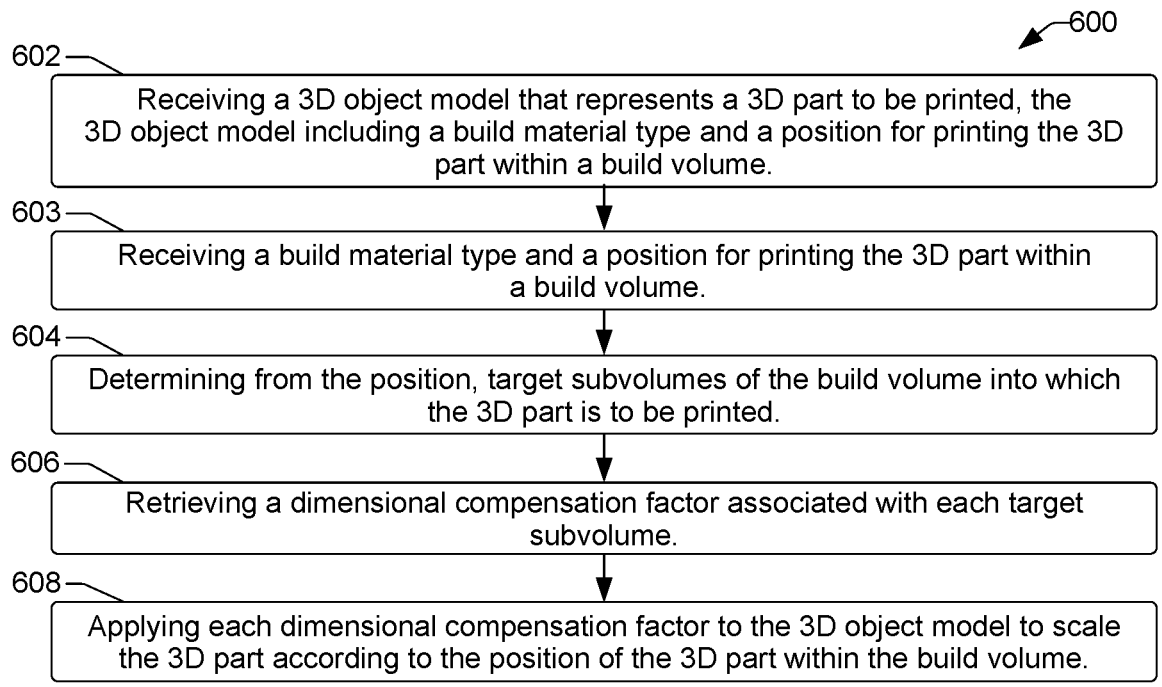

Referring now to the flow diagram of FIG. 6, an example method 600 of compensating for dimensional variation in 3D printing begins at block 602 with receiving a 3D object model that represents a 3D part to be printed, the 3D object model including a build material type and a position for printing the 3D part within a build volume. As shown at block 603, the method includes receiving a build material type and a position for printing the 3D part within a build volume. As shown at block 604, the method includes determining from the position, target subvolumes of the build volume into which the 3D part is to be printed. The method can also include retrieving a dimensional compensation factor associated with each target subvolume, and applying each dimensional compensation factor to the 3D object model to scale the 3D part according to the position of the 3D part within the build volume, as shown at blocks 606 and 608, respectively.

Figure 7:
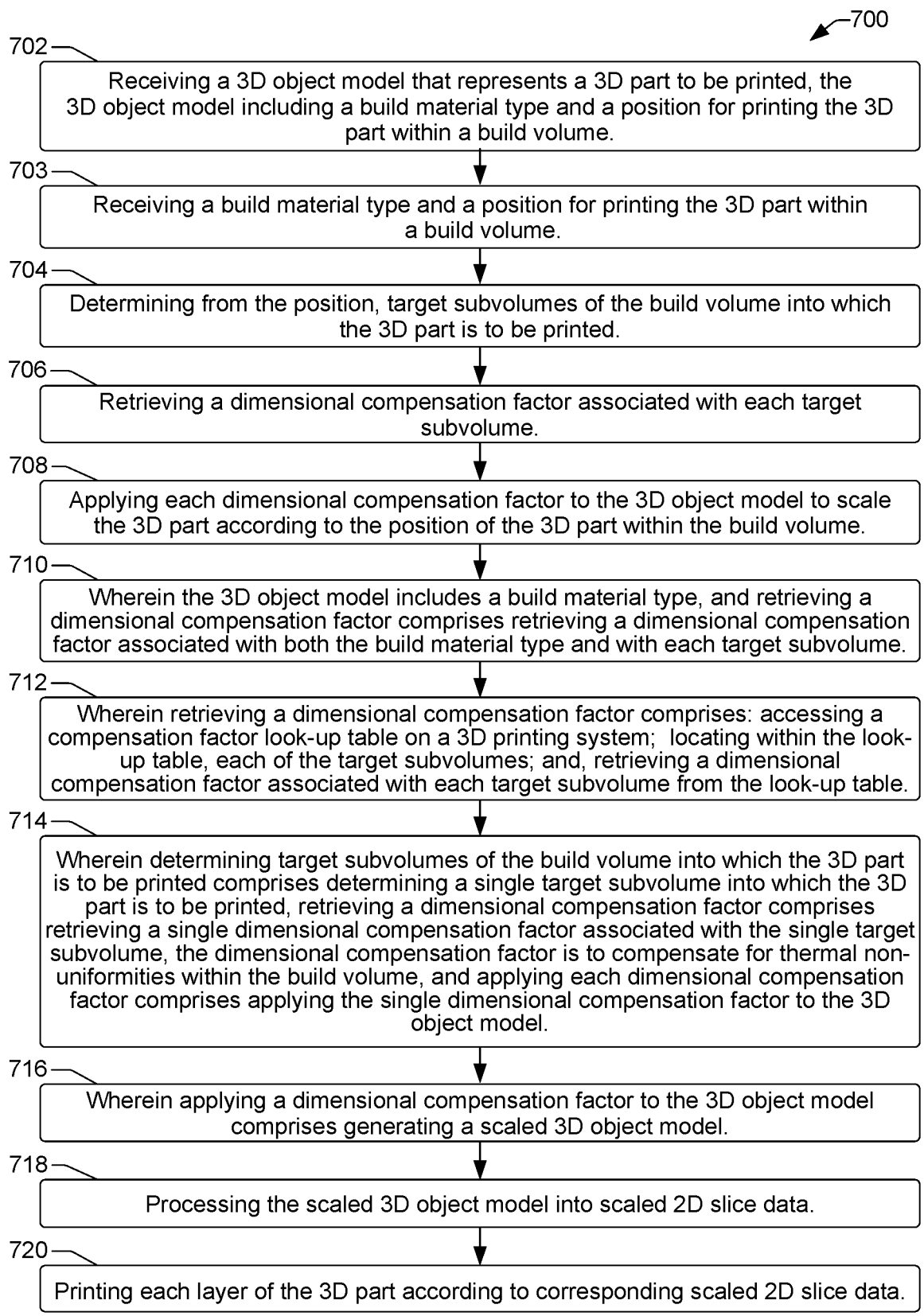

Referring now to the flow diagram of FIG. 7, an example method 700 comprises extensions of method 600 and incorporates additional details of method 600. Thus, method 700 comprises a method of compensating for dimensional variation in 3D printing which begins at block 702 with receiving a 3D object model that represents a 3D part to be printed, the 3D object model including a build material type and a position for printing the 3D part within a build volume. As shown at block 703, the method includes receiving a build material type and a position for printing the 3D part within a build volume. As shown at block 704, the method includes determining from the position, target subvolumes of the build volume into which the 3D part is to be printed. The method can also include retrieving a dimensional compensation factor associated with each target subvolume, and applying each dimensional compensation factor to the 3D object model to scale the 3D part according to the position of the 3D part within the build volume, as shown at blocks 706 and 708, respectively. In some examples, as shown at block 710, the 3D object model includes a build material type, and retrieving a dimensional compensation factor includes retrieving a dimensional compensation factor associated with both the build material type and with each target subvolume. As shown at block 712, in some examples, retrieving a dimensional compensation factor can include accessing a compensation factor look-up table on a 3D printing system, locating each of the target subvolumes within the look-up table, and, retrieving a dimensional compensation factor associated with each target subvolume from the look-up table. As shown at block 714, in some examples, determining target subvolumes of the build volume into which the 3D part is to be printed can include determining a single target subvolume into which the 3D part is to be printed. In addition, retrieving a dimensional compensation factor can include retrieving a single dimensional compensation factor associated with the single target subvolume, and applying each dimensional compensation factor can include applying the single dimensional compensation factor to the 3D object model. As shown at block 716, in some examples, applying a dimensional compensation factor to the 3D object model includes generating a scaled 3D object model. The method can then also include processing the scaled 3D object model into scaled 2D slice data, and printing each layer of the 3D part according to corresponding scaled 2D slice data, as shown at blocks 718 and 720.

Figure 8:
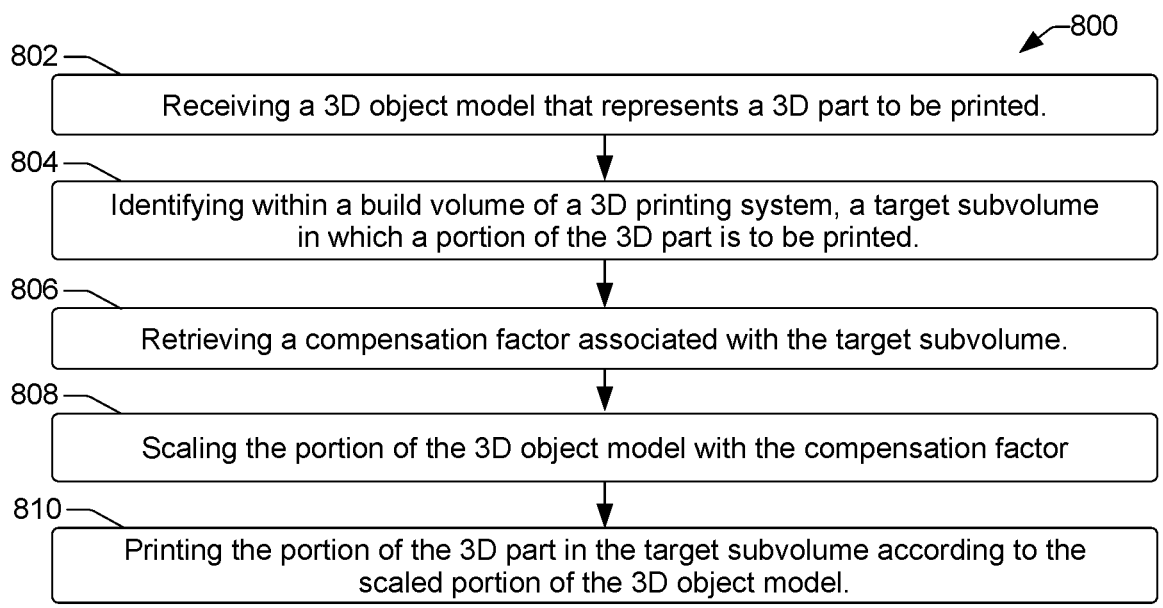

Referring now to the flow diagram of FIG. 8, another example method 800 of compensating for dimensional variation in 3D printing begins at block 802 with receiving a 3D object model that represents a 3D part to be printed. The method also includes identifying within a build volume of a 3D printing system, a target subvolume in which a portion of the 3D part is to be printed, as shown at block 804. The method can further include retrieving a compensation factor associated with the target subvolume, scaling the portion of the 3D object model with the compensation factor, and printing the portion of the 3D part in the target subvolume according to the scaled portion of the 3D object model, as shown at blocks 806, 808, and 810, respectively.

Figure 9:
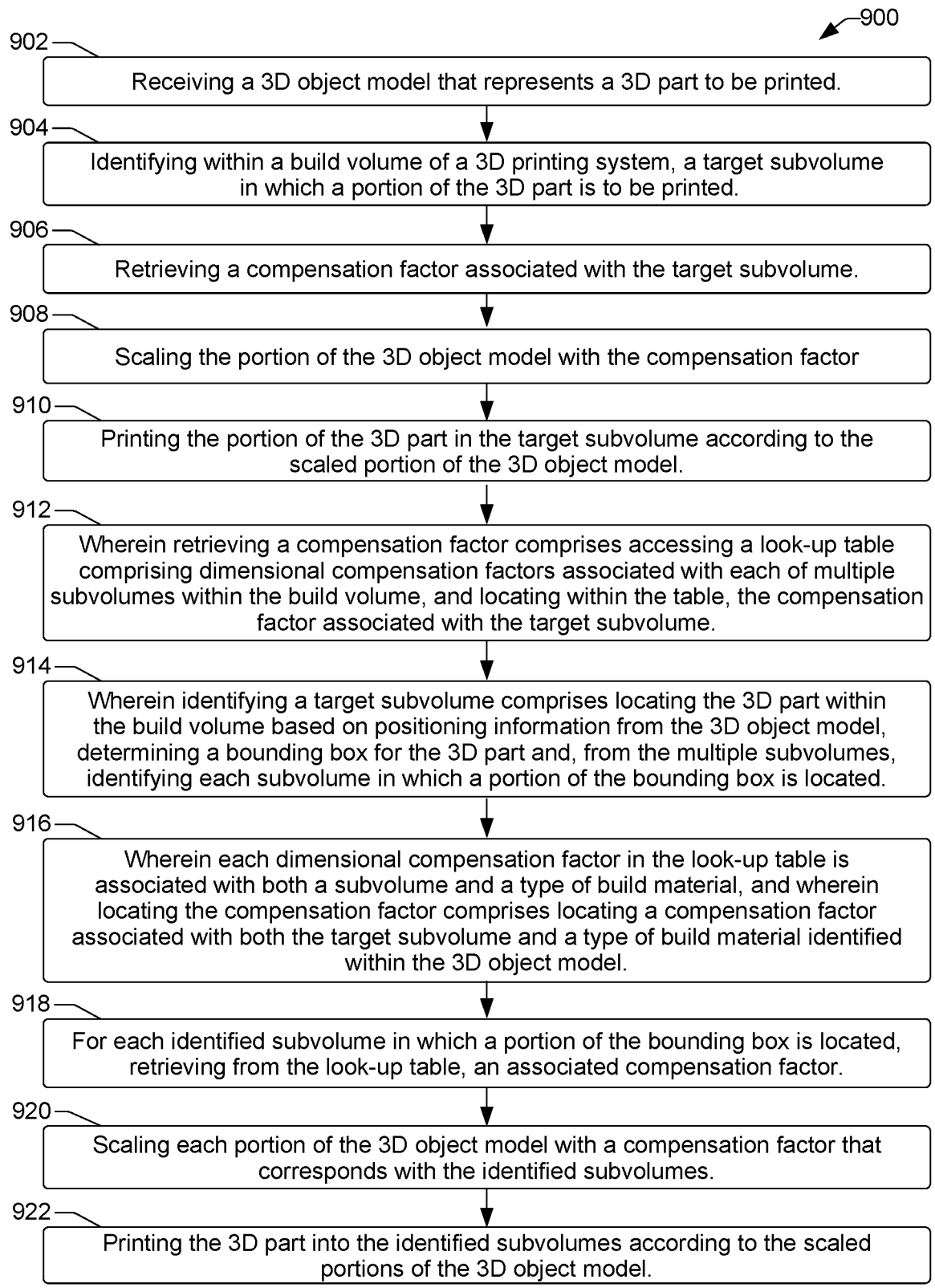

Referring now to the flow diagram of FIG. 9, an example method 900 comprises extensions of method 800 and incorporates additional details of method 800. Thus, method 900 comprises a method of compensating for dimensional variation in 3D printing which begins at block 902 with receiving a 3D object model that represents a 3D part to be printed. The method also includes identifying within a build volume of a 3D printing system, a target subvolume in which a portion of the 3D part is to be printed, as shown at block 904. The method can further include retrieving a compensation factor associated with the target subvolume, scaling the portion of the 3D object model with the compensation factor, and printing the portion of the 3D part in the target subvolume according to the scaled portion of the 3D object model, as shown at blocks 906, 908, and 910, respectively. In some examples, as shown at block 912, retrieving a compensation factor can include accessing a look-up table comprising dimensional compensation factors associated with each of multiple subvolumes within the build volume, and locating within the table, the compensation factor associated with the target subvolume. In some examples, as shown at block 914, identifying a target subvolume can include locating the 3D part within the build volume based on positioning information from the 3D object model, determining a bounding box for the 3D part, and, from the multiple subvolumes, identifying each subvolume in which a portion of the bounding box is located. In some examples, each dimensional compensation factor in the look-up table is associated with both a subvolume and a type of build material, and locating the compensation factor can include locating a compensation factor associated with both the target subvolume and a type of build material identified within the 3D object model, as shown at block 916. The method can further include, for each identified subvolume in which a portion of the bounding box is located, retrieving from the look-up table, an associated compensation factor, as shown at block 918. As shown at blocks 920 and 922, the method can include scaling each portion of the 3D object model with a compensation factor that corresponds with the identified subvolumes, and printing the 3D part into the identified subvolumes according to the scaled portions of the 3D object model.

What is claimed is:

1. A method of compensating for dimensional variation in 3D printing comprising:
   receiving a 3D object model that represents a 3D part to be printed;
   receiving a build material type and a position for printing the 3D part within a build volume;
   determining from the position, target subvolumes of the build volume into which the 3D part is to be printed;
   retrieving a dimensional compensation factor associated with each target subvolume;
   applying each dimensional compensation factor to the 3D object model to scale the 3D part according to the position of the 3D part within the build volume; and,
   printing the scaled 3D part according to the position of the 3D part within the build volume.

2. A method as in claim 1, wherein:
   the 3D object model includes a build material type; and,
   retrieving a dimensional compensation factor comprises retrieving a dimensional compensation factor associated with both the build material type and with each target subvolume.

3. A method as in claim 1, wherein retrieving a dimensional compensation factor comprises:
   accessing a compensation factor look-up table on a 3D printing system;
   locating within the look-up table, each of the target subvolumes; and,
   retrieving a dimensional compensation factor associated with each target subvolume from the look-up table.

4. A method as in claim 1, wherein:
   determining target subvolumes of the build volume into which the 3D part is to be printed comprises determining a single target subvolume into which the 3D part is to be printed;
   retrieving a dimensional compensation factor comprises retrieving a single dimensional compensation factor associated with the single target subvolume;
   the dimensional compensation factor is to compensate for thermal non-uniformities within the build volume; and,
   applying each dimensional compensation factor comprises applying the single dimensional compensation factor to the 3D object model.

5. A method as in claim 1, wherein printing the scaled 3D part comprises:
   generating a scaled 3D object model;
   processing the scaled 3D object model into scaled 2D slice data; and,
   printing each layer of the scaled 3D part according to corresponding scaled 2D slice data.

6. A dimensional variation compensating 3D printing system comprising:
   a memory to receive a 3D object model that represents a 3D part to be printed within a build volume of the 3D printing system, the 3D object model including positioning information for positioning the 3D part within the build volume;
   a processor programmed to identify, based on the positioning information, a target subvolume within the build volume in which a portion of the 3D part is to be printed;
   a source for dimensional compensation factors associated with each of multiple subvolumes within the build volume, wherein the processor is programmed to access the source, retrieve a compensation factor associated with the target subvolume, and scale the portion of the 3D object model with the compensation factor; and,
   print system components controlled by the processor to print the portion of the 3D part into the target subvolume according to the scaled portion of the 3D object model.

7. A 3D printing system as in claim 6, wherein:
   the 3D object model comprises a build material type; and,
   the processor is programmed to identify target subvolumes based on both the positioning information and the build material type.

8. A 3D printing system as in claim 7, wherein the source for dimensional compensation factors comprises a look-up table, the look-up table comprising dimensional compensation factors associated with the build material type and with each of the multiple subvolumes, and wherein the processor is programmed to retrieve compensation factors associated with target subvolumes and the build material type.

9. A 3D printing system as in claim 6, wherein identifying a target subvolume within the build volume comprises:
   identifying multiple target subvolumes in which all portions of the 3D part are to be printed;
   obtaining a bounding box of the 3D part;
   computing a central point of the bounding box; and,
   performing a trilinear interpolation of the central point.

10. A method of compensating for dimensional variation in 3D printing comprising:
   receiving a 3D object model that represents a 3D part to be printed;
   identifying within a build volume of a 3D printing system, a target subvolume in which a portion of the 3D part is to be printed by locating the 3D part within the build volume based on positioning information from the 3D object model;
   retrieving a compensation factor associated with the target subvolume;
   scaling the portion of the 3D object model with the compensation factor; and,
   printing the portion of the 3D part in the target subvolume according to the scaled portion of the 3D object model.

11. A method as in claim 10, wherein retrieving a compensation factor comprises:
- accessing a look-up table comprising dimensional compensation factors associated with each of multiple subvolumes within the build volume; and,
- locating within the table, the compensation factor associated with the target subvolume.

12. A method as in claim 11, wherein identifying a target subvolume comprises:
- determining a bounding box for the 3D part; and,
- from the multiple subvolumes, identifying each subvolume in which a portion of the bounding box is located.

13. A method as in claim 12, further comprising:
- for each identified subvolume in which a portion of the bounding box is located, retrieving from the look-up table, an associated compensation factor;
- scaling each portion of the 3D object model with a compensation factor that corresponds with the identified subvolumes; and,
- printing the 3D part into the identified subvolumes according to the scaled portions of the 3D object model.

14. A method as in claim 11, wherein each dimensional compensation factor in the look-up table is associated with both a subvolume and a type of build material, and wherein locating the compensation factor comprises locating a compensation factor associated with both the target subvolume and a type of build material identified within the 3D object model.

* * * * *